(12) United States Patent
Baig et al.

(10) Patent No.: US 12,183,192 B2
(45) Date of Patent: Dec. 31, 2024

(54) INTERSECTION RISK INDICATOR

(71) Applicant: Nissan North America, Inc., Franklin, TN (US)

(72) Inventors: Najamuddin Mirza Baig, San Jose, CA (US); Xin Yang, Palo Alto, CA (US)

(73) Assignee: Nissan North America, Inc., Franklin, TN (US)

( * ) Notice: Subject to any disclaimer, the term of this patent is extended or adjusted under 35 U.S.C. 154(b) by 265 days.

(21) Appl. No.: 17/408,907

(22) Filed: Aug. 23, 2021

(65) Prior Publication Data

US 2023/0054974 A1 Feb. 23, 2023

(51) Int. Cl.
*G08G 1/01* (2006.01)
*B60W 30/18* (2012.01)
(Continued)

(52) U.S. Cl.
CPC ............. *G08G 1/0141* (2013.01); *B60W 30/18154* (2013.01); *B60W 40/04* (2013.01);
(Continued)

(58) Field of Classification Search
CPC ............. G08G 1/0141; G08G 1/0116; G08G 1/0133; G08G 1/0112; G08G 1/162;
(Continued)

(56) References Cited

U.S. PATENT DOCUMENTS

2017/0032402 A1* 2/2017 Patsiokas ............ G06Q 30/0207
2017/0243485 A1* 8/2017 Rubin ..................... H04W 4/46
(Continued)

OTHER PUBLICATIONS

Kieu, L. M., Ou, Y., Truong, L. T., & Cai, C. (2020). A class-specific soft voting framework for customer booking prediction in on-demand transport. Transportation Research Part C: Emerging Technologies, 114, 377-390. (Year: 2020) .*
S.M. Sohel Mahmud, Luis Ferreira, Md. Shamsul Hoque, Ahmad Tavassoli, Application of proximal surrogate indicators for safety evaluation: A review of recent developments and research needs, IATSS Research, vol. 41, Issue 4, 2017, pp. 153-163.
Lisheng Jin, Qingning Niu, Haijing Hou, Huacai Xian, Yali Wang, Dongdong Shi, "Driver Cognitive Distraction Detection Using Driving Performance Measures", Discrete Dynamics in Nature and Society, vol. 2012, Article ID 432634, 12 pages, 2012.
(Continued)

*Primary Examiner* — Aniss Chad
*Assistant Examiner* — Stephanie T Su
(74) *Attorney, Agent, or Firm* — Young Basile Hanlon & MacFarlane, P.C.

(57) ABSTRACT

A method and system for determining risk indicators for intersections. A method includes receiving, by a computing node from intersection proximate sensors at each intersection, intersection data. For each intersection, the method includes determining, by the computing node for each connected vehicle proximate to an intersection, a driver risk score based on driver distraction data from the intersection data for the intersection, determining, by the computing node, a near miss score based on the intersection data for the intersection, and assigning, by the computing node for the intersection, an intersection risk indicator level based on an exponential moving average of intersection risk indicator scores determined from driver risk scores and near miss scores. The method includes providing, by the computing node, intersection risk indicator levels to each connected vehicle to facilitate control decisions by each connected vehicle when approaching intersections.

16 Claims, 5 Drawing Sheets

(51) Int. Cl.
*B60W 40/04* (2006.01)
*B60W 40/09* (2012.01)
*B60W 50/14* (2020.01)
*B60W 60/00* (2020.01)

(52) U.S. Cl.
CPC ............ *B60W 40/09* (2013.01); *B60W 50/14* (2013.01); *B60W 60/0015* (2020.02); *G08G 1/0116* (2013.01); *G08G 1/0133* (2013.01); *B60W 2554/404* (2020.02)

(58) Field of Classification Search
CPC ........ G08G 1/163; G08G 1/164; G08G 1/166; B60W 30/18154; B60W 40/04; B60W 40/09; B60W 50/14; B60W 60/0015; B60W 2554/404; B60W 30/095; G06V 20/58; G06N 20/00; H04W 4/44
See application file for complete search history.

(56) References Cited

U.S. PATENT DOCUMENTS

| | | | |
|---|---|---|---|
| 2018/0075309 A1* | 3/2018 | Sathyanarayana | G05D 1/0055 |
| 2019/0263417 A1* | 8/2019 | Rau | H04W 4/90 |
| 2019/0265712 A1* | 8/2019 | Satzoda | B60W 40/09 |
| 2020/0369270 A1* | 11/2020 | Antonsson | G08G 1/0129 |

OTHER PUBLICATIONS

Xiupeng Shi, Yiik Diew Wong, Michael Zhi-Feng Li, Chandrasekar Palanisamy, Chen Chai, A feature learning approach based on XGBoost for driving assessment and risk prediction, Accident Analysis & Prevention, vol. 129, 2019, pp. 170-179.

* cited by examiner

INTERSECTION RISK INDICATOR

TECHNICAL FIELD

This disclosure relates to connected vehicles and vehicle transportation networks, and more particularly to determining risk indicators for intersections in the vehicle transportation networks.

BACKGROUND

Transportation network data from and related to vehicle transportation networks and users of and proximate to the vehicle transportation networks is available from sensors on vehicles traversing the vehicle transportation networks and from infrastructure sensors proximate to the vehicle transportation networks. The transportation network data can be received or obtained from a variety of sources including fixed infrastructure such as traffic cameras and inductive-loop traffic sensors, self-reported location and state information from connected road users (as defined by the SAE J2735 standard), and connected vehicle mounted sensors. This transportation network data can be used to generate detailed, real-time, and semi-real-time knowledge of risk in the vehicle transportation network. The knowledge is important for vehicle safety and guidance and for traffic and safety management. Some risk indicators include Time To Collision (TTC) which rates the severity of conflicts, Time Exposed Time to Collision (TET) which represents a measure of the length of time a TTC-event remains below a designated TTC-threshold, Time Integrated TTC (TIT) which represents a measure of the integral of the TTC-profile during the time it is below the threshold, and Post-Encroachment Time (PET) which is appropriate for conflicts assessment at intersections and is the time of a vehicle traveling to a location where another vehicle once occupied.

Intersection-related accidents account for 40-50% of road crashes in most countries. Intersections are the most complex and hazardous areas of the transportation network. Consequently, there is interest in risk analysis by numerous safety improvement programs in the past ten years. Risk assessment of intersections is the evaluation and applicability of risk indicators for intersection traffic scenarios. Processing, however, the collected transportation network data is complicated by the large volume and by the need to provide meaningful insights from the collected transportation network data.

SUMMARY

Disclosed herein are aspects, features, elements, implementations, and embodiments of a system and method for providing risk indicators for intersections in the transportation networks.

An aspect of the disclosed embodiments is a method for determining an intersection risk indicator which includes receiving, by a computing node from intersection proximate sensors at each intersection, intersection data. For each intersection, the method includes determining, by the computing node for each connected vehicle proximate to an intersection, a driver risk score based on driver distraction data from the intersection data for the intersection, determining, by the computing node, a near miss score based on the intersection data for the intersection, and assigning, by the computing node for the intersection, an intersection risk indicator level based on an exponential moving average of intersection risk indicator scores determined from driver risk scores and near miss scores. The method includes providing, by the computing node, intersection risk indicator levels to each connected vehicle to facilitate control decisions by each connected vehicle when approaching intersections.

Another aspect of the method includes where the intersection proximate sensors includes at least connected vehicle sensors from connected vehicles proximate to each intersection. The determining the driver risk score further including clustering, using an unsupervised machine learning algorithm, the driver distraction data from each of the connected vehicles proximate to the intersection based on driving performance measures and driver physical measures and assigning a driver risk score for each risk cluster.

Another aspect of the method includes where the intersection proximate sensors includes at least infrastructure sensors proximate each intersection. The determining the near miss score further including filtering the intersection data based on near miss criteria to detect near miss candidates, classifying, using a machine learning algorithm, the near miss candidates as a near miss, and assigning the near miss score based on number of near misses.

Another aspect of the method includes where determining the intersection risk indicator scores further includes determining a simple moving average of the driver risk scores and the near miss scores for a time period, wherein the exponential moving average is a weighted average of an intersection risk indicator score from a current time period and the simple moving average of a previous time period.

Another aspect of the method includes where the near miss criteria includes one or more of braking time relative to obstacle, following distance relative to braking distance, obstacle distance relative to braking distance, vehicle deceleration, lane exceedance probability, or glance duration.

Another aspect of the method includes where the intersection risk indicator levels are updated based on a defined period.

Another aspect of the method includes where the intersection risk indicator levels are different for different times of day.

Another aspect of the method includes providing, by the computing node, the intersection risk indicator levels to traffic management entities to facilitate traffic management at the intersections.

Another aspect of the method includes providing, by the computing node, the intersection risk indicator levels to enable advanced driver-assistance systems on each connected vehicle to alert a driver based on the intersection risk indicator level.

Another aspect of the method includes providing, by the computing node, the intersection risk indicator levels to each connected vehicle to populate a mapping database.

Another aspect of the method includes where the computing node is one or more of a connected vehicle, an edge compute node, or a cloud computing node.

An aspect of the disclosed embodiments is a system which includes a compute node, intersection infrastructure sensors configured to send intersection infrastructure sensor data to the compute node, and one or more connected vehicles configured to send intersection proximate data to the compute node. The compute node is configured to for each intersection that each of the one or more connected vehicles intersects, determine a driver risk score for each connected vehicle from driver distraction data in the intersection infrastructure sensor data and the intersection proximate data, for each intersection, determine a near miss score based on the intersection infrastructure sensor data and the intersection proximate data for that intersection, for each intersection, assign an intersection risk indicator level based on an exponential moving average of intersection risk indicator scores determined from driver risk scores and near miss scores for that intersection, and for each of the one or more connected vehicles, provide intersection risk indicator levels to facilitate control decisions by each of the one or more connected vehicles.

In another aspect of the system, the compute node is further configured to use an unsupervised machine learning algorithm to cluster the driver distraction data from each of the connected vehicles based on driving performance measures and driver physical measures and assign a driver risk score for each risk cluster.

In another aspect of the system, the compute node is further configured to filter the intersection infrastructure sensor data and the intersection proximate data based on near miss criteria to detect near miss candidates and use a machine learning algorithm to classify the near miss candidates as a near miss and assign the near miss score based on number of near misses.

In another aspect of the system, the compute node is further configured to determine a simple moving average of driver risk scores and near miss scores for a time period, wherein the exponential moving average is a weighted average of an intersection risk indicator score from a current time period and the simple moving average of a previous time period.

In another aspect of the system, intersection risk indicator levels are updated based on a defined period and wherein the intersection risk indicator levels are different for different times of day.

In another aspect of the system, the computing node is one or more of an edge compute node or a cloud computing node.

An aspect of the disclosed embodiments is an autonomous vehicle which includes a sensor system having one or more vehicle sensors configured to send sensor data to a compute node, one or more processors that execute computer-readable instructions that cause the one or more processors to receive, from the compute node, intersection risk indicator levels for intersections based on an exponential moving average of intersection risk indicator scores determined from driver risk scores and near miss scores using at least sensor data from the autonomous vehicle and other autonomous vehicles, determine a control action for the autonomous vehicle to perform based on the intersection risk indicator level as the autonomous vehicle approaches an intersection, and control the autonomous vehicle based on the control action.

In another aspect of the autonomous vehicle, the control action is an alert to the user of the autonomous vehicle.

In another aspect of the autonomous vehicle, the intersection risk indicator levels are updated based on a defined period and wherein the intersection risk indicator levels are different for different times of day.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
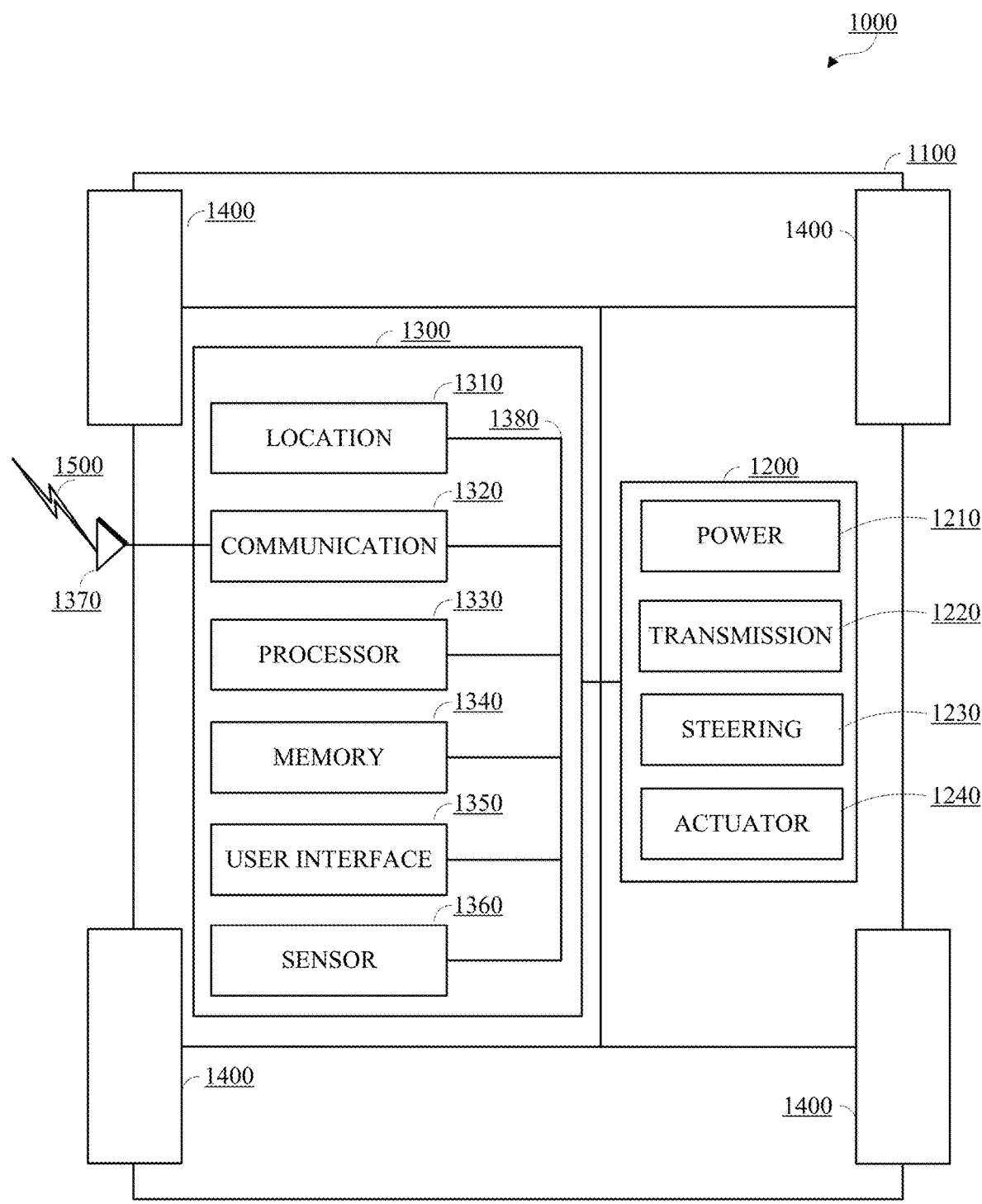
FIG. 1 is a diagram of an example of a vehicle in which the aspects, features, and elements disclosed herein may be implemented.

A system and method for determining risk indicators at intersections is described herein. Intersection data, which is a part of vehicle transportation network data or transportation network data, for intersections in a transportation network can be received, obtained, or collected (collectively "collected") from a variety of sources including, but not limited to, fixed infrastructure, self-reported location and state information from connected transportation network users, and connected vehicle mounted sensors. A transportation network may refer to a structure that permits vehicular movement (e.g., a road, street, highway, intersection, etc.).

The system is configured to provide an assessment of risk when traversing an intersection using the near real-time intersection data collected from sensors on connected vehicles (collectively "connected vehicle sensors") which provide insights into the events around the connected vehicle and from infrastructure sensors proximate each intersection (collectively "infrastructure sensors") (collectively "intersection proximate sensors").

Risk assessment of intersections is the evaluation and applicability of risk factors or indicators for intersection traffic scenarios. The system is configured to determine an intersection risk indicator level based on two risk factors at each intersection, driver distraction and near misses. Each of these risk factors can be determined from the intersection data. The system is configured to determine an intersection risk indicator by assessing the intersection safety by fleet voting of driver distraction or attention score with a penalty for detected near miss or crashes if any. That is, the driver distraction or attention score is a baseline score with is modified by a penalty score, i.e., near miss score. The system is configured to identify near miss cases from the intersection data to determine a near miss score, determine a driver attention score when passing the intersection using the intersection data, and combine the near miss score and the driver distraction or attention score in an exponential moving average (EMA) expression to determine intersection risk indicator scores, where the intersection risk indicator score is the voting risk score from each collected vehicle when passing an intersection. The EMA expression provides more weight to recently collected intersection data (i.e., current connected vehicle activity). Each intersection risk indicator score may be associated with an intersection risk indicator level. For example, high, medium, or low. In implementations, the method may be performed offline or near real-time and provided to the connected vehicles and entities associated with traffic management and safety. In implementations, the intersection risk indicator scores may be updated periodically, event driven, or combinations thereof.

Driver distractions are considered to be a major risk factor in driving incidents. The availability of technologies within the vehicle that can be distracting to a driver continually increases. However, there is no clear evidence which shows an increase or decrease in the level of driver distraction. Driver distraction as a causal factor in accident rates can be difficult to measure due to different definitions for driver distraction and data collection methods. Typically, there five types of measures for driver inattention detection including subjective report measures (e.g., Stanford Sleepiness Scale (SSS), Karolinska Sleepiness Scale (KSS)), driver biological measures (e.g., Electroencephalography (EEG), electrocardiography (ECG)), driver physical measures (e.g., PER-CLOS, gaze direction), driving performance measures (e.g., steering wheel angle, yaw angle), and hybrid measures. In real-life, only driver physical measures, driving performance measures and hybrid measures are applicable.

The system is configured to apply unsupervised machine learning algorithms and models to the intersection data to estimate driver risk levels for the connected vehicles. Clustering-based risk grading is used to cluster connected vehicles with similar risk patterns (as measured by risk indicator features in the intersection data) into the same groups, and then decode the risk level or score of each group. The system is configured to use driver's driving performance and physical measures as the risk indicator features. Given that there are no ground-truth labels about risk levels, this method can discover data-driven insights about risk exposures and act as an unsupervised process for data labelling. As stated, this is the base score for the intersection risk indicator score.

Near misses can include near misses and near collisions. The Occupational Safety and Health Administration defines near misses as "incidents in which no property was damaged and no personal injury was sustained, but where, given a slight shift in time or position, damage or injury easily could have occurred." Near collisions are similar to near misses except that they involve moving objects. The term near miss is meant to refer to both near misses and near collisions.

The system is configured to generate near miss candidates by filtering the intersection data based on criteria to infer safety impact or indicative of near misses. In implementations, the near miss criteria can include braking time less than the time required to brake prior to hitting an obstacle, distance to following vehicle is less than braking distance, distance to obstacle is less than braking distance, vehicle deceleration is greater than a threshold (e.g., 0.4 g), probability of lane exceedance is less than a defined percentage (e.g., 3%) for a 12 foot lane and less than a defined percentage (e.g., 15%) for a 10 foot lane, and glance duration is less than or equal to a threshold time period (e.g., 2 seconds). The system is configured to apply machine learning or neural network algorithms to classify the near miss candidates. The system is configured to assign a near miss score based on number or frequency of near misses at an intersection. As stated, this is a penalty factor that is added to the base score.

The intersection data is absent personal identifiable information as the system leverages connected vehicle data that is consolidated or aggregated from multiple connected vehicles to reflect events or activity at intersections.

In implementations, a technological improvement enables or provides enhanced safety in the use of autonomous vehicles by providing the intersection risk indicator levels to connected vehicles to aid driver alertness, vehicle planning, vehicle route planning, update map data, cause ADAS systems to use safe mode when navigating a higher risk intersection (e.g., to indicate to the driver to adopt hands on steering wheel for the intersection), and other related information or services, and provided to entities such as transportation agencies for traffic and safety management at the intersection to ensure sensors are working as expected or provide coverage for intersections which are prone to be high risk.

FIG. 1 is a diagram of an example of a vehicle in which the aspects, features, and elements disclosed herein may be implemented, may be implemented with, or combinations thereof. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include controlling a kinetic state of the vehicle, such as by accelerating or decelerating, controlling a directional state of the vehicle, such as by steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), and lithium-ion (Li-ion), solar cells, fuel cells, or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
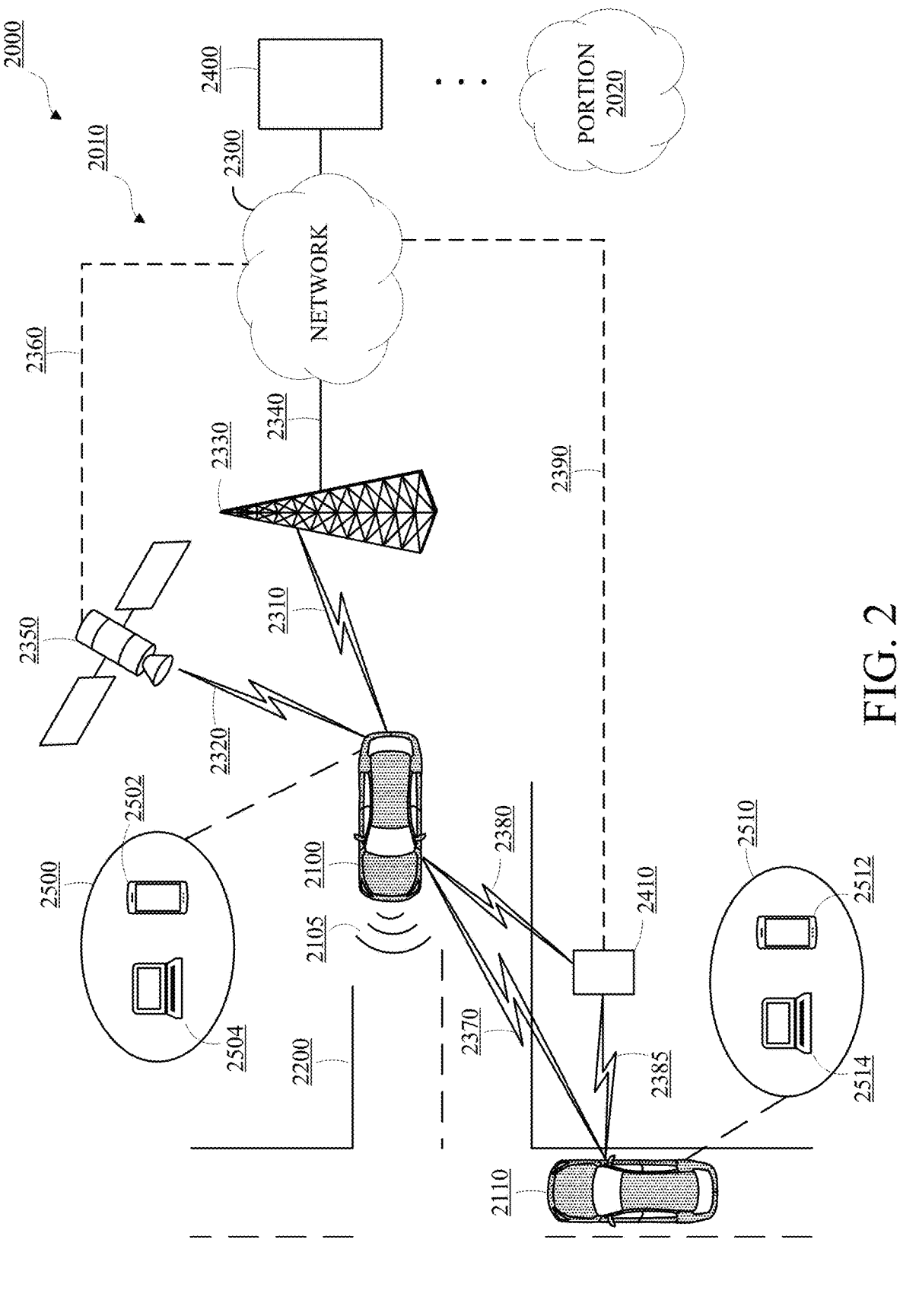
FIG. 2 is a diagram of an example of a portion of a vehicle transportation network and communication system in accordance with embodiments of this disclosure.

FIG. 2 is a diagram of an example of portions of a vehicle transportation and communication system in which the aspects, features, and elements disclosed herein may be implemented. The vehicle transportation and communication system 2000 may include one or more portions 2010 and 2020 where some components or elements may overlap. A portion 2010 of the vehicle transportation and communication system 2000 may include one or more vehicles 2100/2110, such as the vehicle 1000 shown in FIG. 1, which may travel via one or more portions, such as the portions 2010 and 2020, of one or more vehicle transportation networks 2200 and may communicate via one or more electronic communication networks 2300 (which can be referred to as a "connected vehicle" as appropriate and applicable). For example, the one or more vehicles 2100/2110 can be a vehicle with no automation, a vehicle with driver assistance, a vehicle with partial automation, a vehicle with conditional automation, a vehicle with high automation, a vehicle with full automation, or combinations thereof. For example, the one or more vehicles 2100/2110 can be a level 0 vehicle, a level 1 vehicle, a level 2 vehicle, a level 3 vehicle, a level 4 vehicle, a level 5 vehicle, or combinations thereof as defined by the Society of Automotive Engineers (SAE) International.

Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more compute devices, such as a cloud computing platform or device 2400 and an edge computing device 2410. The edge computing device 2410 may be associated with a defined region of the vehicle transportation network, such as a lane, a road segment, a contiguous group of road segments, a road, or an intersection, or a defined geographic region, such as a block, a neighborhood, a district, a county, a municipality, a state, a country, or another defined geographic region. In FIG. 2, the region is the portion 2010. The cloud computing platform or device 2400 can be associated with multiple regions and connected to multiple edge computing devices. In FIG. 2, the multiple regions are the portions 2010 and 2020.

In an example, a vehicle 2100/2110 may receive intersection risk indicator levels from the cloud computing platform or device 2400 via the network 2300. The intersection risk indicator levels can be used to alert a driver, control vehicle actions, impact driver assistance systems, or combinations thereof. For example, the intersection risk indicator levels may be based on intersection data. In implementations, the intersection data and intersection risk indicator levels can be provided at an update rate to plan steering and braking actions, for example.

The vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

In some embodiments, a vehicle 2100/2110 may communicate via a wired communication link (not shown), a wireless communication link 2310/2320/2370/2380/2385, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via the network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds. The direct communication link 2370 may be, for example, a wireless communication link.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state. The vehicle transportation network data may include the automated inter-vehicle messages.

The vehicle 2100 may communicate with the communications network 2300 via an access point 2330. The access point 2330, which may include a computing device, may be configured to communicate with a vehicle 2100, with a communication network 2300, with one or more compute devices 2400/2410, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more compute devices 2400/2410, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements. The compute devices 2400/2410 may communicate, such as via a communication link 2390.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both. The vehicle transportation network data may include the sensor data.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and two compute devices 2400/2410, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the compute device 2400 via the network 2300, the vehicle 2100 may communicate with the compute device 2400 via any number of direct or indirect communication links. For example, the vehicle 2100 may communicate with the compute device 2400/2410 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
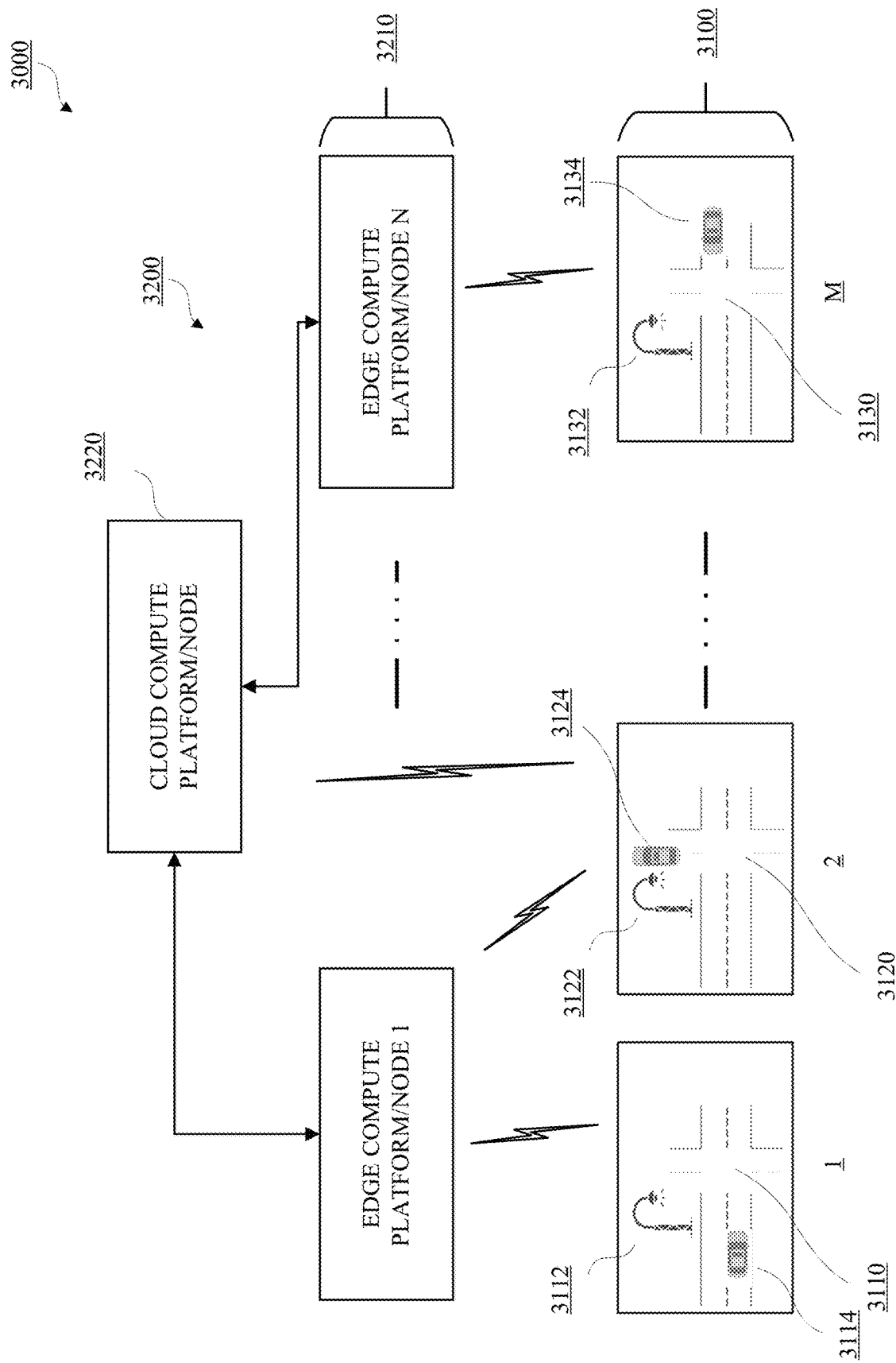
FIG. 3 is a diagram of an example of a vehicle transportation network and communication system in accordance with embodiments of this disclosure.

FIG. 3 is a diagram of an example of a vehicle transportation network and compute system for determining intersection risk indicator levels in which the aspects, features, and elements disclosed herein may be implemented. The elements and components shown in FIG. 2 can be included as appropriate and applicable and are not shown for ease of description and illustration of related elements and components. The vehicle transportation and compute system 3000 may include a vehicle transportation network 3100 and a compute system 3200.

The vehicle transportation network 3100 may include multiple regions 1 . . . M, wherein each region maybe include an intersection such as intersections 3110, 3120, and 3130. Each region 1 . . . M may further include lanes, road segments, contiguous group of road segments, or roads which are not shown for ease of illustration. Some intersection such as intersections 3110, 3120, and 3130 may include vehicle transportation network infrastructure which are proximate to the intersection and may sense or capture vehicle transportation network data such as intersection data which can be communicated to the compute system 3200. For example, the intersection 3110 can include a roadside light 3112, the intersection 3120 can include a roadside light 3122, and the intersection 3130 can include a roadside light 3132. Connected vehicles 3114, 3124, and 3134 may be approaching, traversing, or gone through the intersections 3110, 3120, and 3130, respectively, and captured intersection data which can be communicated to the compute system 3200.

The compute system 3200 may include one or more edge compute devices such as edge compute devices 1 . . . N 3210 and a cloud compute platform 3220. In implementations, the compute devices 1 . . . N 3210 and a cloud compute platform 3220 may exchange intersection risk indicator levels to increase computational efficiency, faster updates, or combinations thereof. The edge computing devices 1 . . . N 3210 may be associated with a defined region of the vehicle transportation network. The cloud computing platform or device 3220 can be associated with multiple regions and connected to multiple edge computing devices. Although edge compute devices are described herein, other decentralized compute devices may be used. Although a cloud compute platform is described herein, other centralized compute platforms may be used.

As described herein, the intersection data can be provided to the edge compute devices 1 . . . N 3210, the cloud compute platform 3220, or combinations thereof. The edge compute devices such as the edge compute devices 1 . . . N 3210 can have low latency communication links so that near real-time or real-time intersection risk indicator levels can be provided to the connected vehicles or other relevant entities as described herein. The edge compute devices 1 . . . N 3210 can also determine non real-time intersection risk indicator levels. The near real-time or real-time intersection risk indicator levels can be used for driver alerts or routing, planning, or other vehicle control actions. The cloud compute platform or device 3220 can provide non real-time intersection risk indicator levels to the connected vehicles or other relevant entities as described herein. These non real-time intersection risk indicator levels can be used for updating map data, safety and traffic management, driver alerts, or some vehicle control actions.

In implementations, a connected vehicle can determine non real-time, near real-time, or real-time intersection risk indicator levels from the intersection data. The type of intersection risk indicator level may depend on proximity of the intersection and nominal compute times. In implementations, intersection risk indicator levels may be exchanged between each type of compute node, i.e., edge compute node, cloud compute node, or connected vehicle, to increase computational efficiency, provide faster updates, or combinations thereof.

Figure 4:
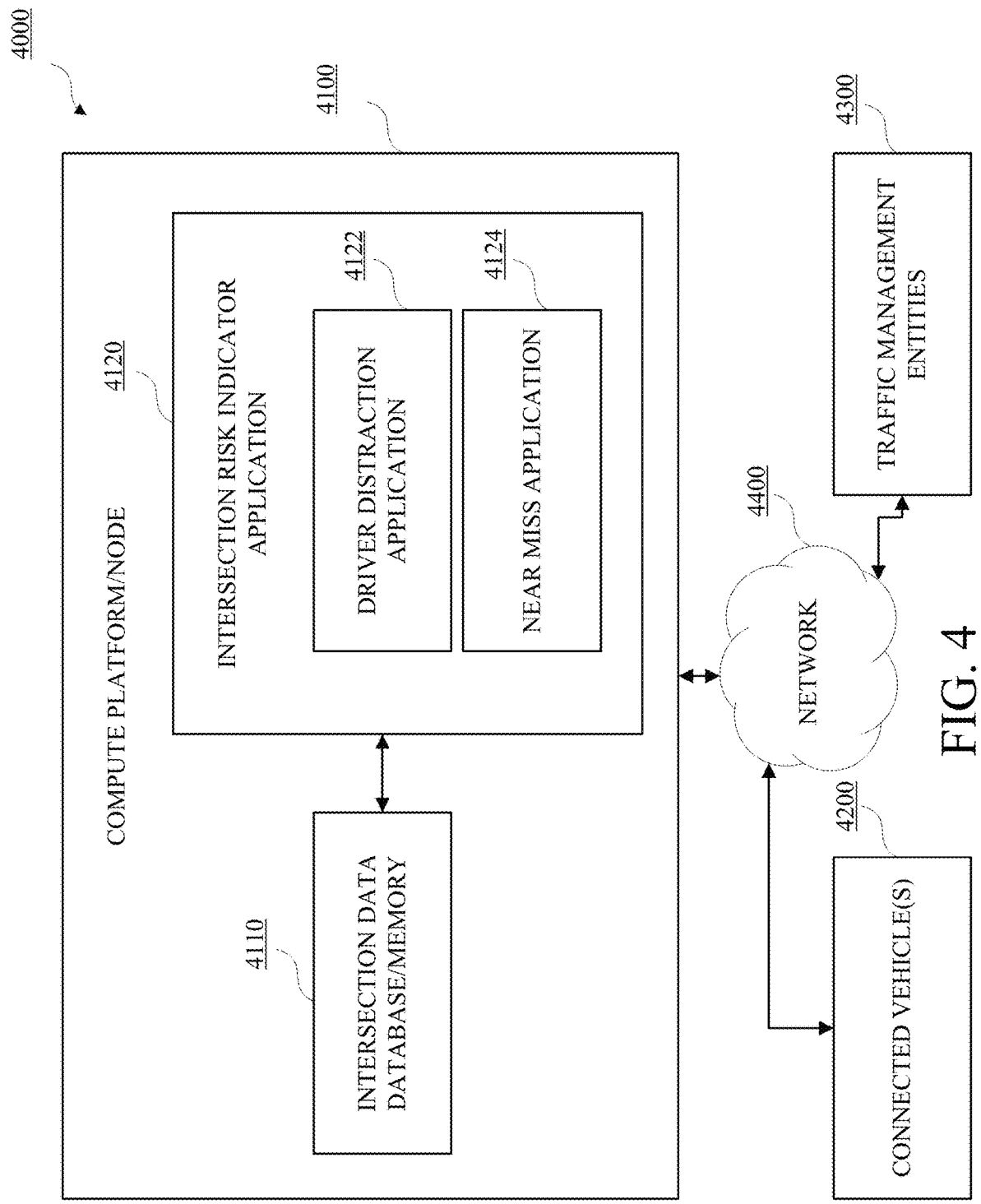
FIG. 4 is a diagram of an example system in accordance with embodiments of this disclosure.

FIG. 4 is a diagram of an example system 4000 for determining intersection risk indicator levels in accordance with embodiments of this disclosure. The elements and components shown in FIG. 2 and FIG. 3 can be included as appropriate and applicable and are not shown for ease of description and illustration of related elements and components. The system 4000 may include a compute platform or node 4100 in communication with or connected to (collectively "connected to") connected vehicles 4200 and 4300 via a network 4400.

The network 4400 may be the electronic communication network 2300 of FIG. 2 or other wired networks, wireless networks, or combinations thereof which enable transfer of data between the compute platform or node 4100 and the connected vehicles 4200 and 4300.

The compute platform or node 4100 can be the vehicle 1000, the one or more vehicles 2100/2110, the cloud computing platform or device 2400, the edge computing device 2410, the compute system 3200, the edge compute devices 1 . . . N 3210, the cloud compute platform 3220, and the connected vehicles 3114, 3124, and 3134, for example.

The compute node 4100 can include an intersection data database, memory, or storage 4110 which includes intersection data from the connected vehicles 4200 and 4300 and other connected vehicles and infrastructure sensors as described herein. The intersection data includes data to determine driver distractedness as described herein, data to determine near misses as described herein, geotag or geolocation information, timestamps, and other associated fields.

The compute node 4100 can include an intersection risk indicator level application, software, program, code, or instructions 4120 (collectively "application") which includes driver distraction application 4122 and near miss application 4124. In implementations, the intersection risk indicator level application 4120, the driver distraction application 4122, and the near miss application 4124 are integrated as one application.

The driver distraction application 4122 can use an unsupervised machine learning or neural network model based clustering algorithm to group connected vehicles with similar risk patterns as measured by risk indicator features and decode or assign a driver risk level or score for each group. The driver distraction application 4122 is configured to use the trained model to assign driver risk levels or scores to connected vehicles in relation to associated intersections.

The near miss application 4124 can filter the intersection data for near miss candidates. The near miss application 4124 can use a machine learning or neural network model to classify the near miss candidates. The near miss application 4124 is configured to use the trained model to assign a near miss score based on number or frequency of near misses at an intersection.

The intersection risk indicator level application 4120 can determine an intersection risk indicator score (SCORE) for a current time period or interval T:

$$\text{SCORE}_T = \text{DRIVER RISK SCORE} + \text{NEAR MISS SCORE} \quad \text{(Equation 1)}$$

The intersection risk indicator level application 4120 can then assign an intersection risk indicator level by determining an exponential moving average (EMA) for T:

$$\text{EMA}_T = \text{SCORE}_T \times k + \text{SMA}_{T-1} \times (1-k) \quad \text{(Equation 2)}$$

where $\text{SMA}_{T-1}$ is a simple moving average of previously determined SCORES and k is a weighting factor between (0,1) to emphasize a current time period SCORE.

The compute node 4100 can execute the intersection risk indicator level application 4120, the driver distraction application 4122, and the near miss application 4124 on the appropriate intersection data to determine the driver risk score, the near miss score, the simple moving average, the exponential moving average, and the intersection risk indicator level. The compute node 4100 can provide intersection risk indicator levels for appropriate and applicable intersection to connected vehicles 4200 and 4300 as described herein.

Figure 5:
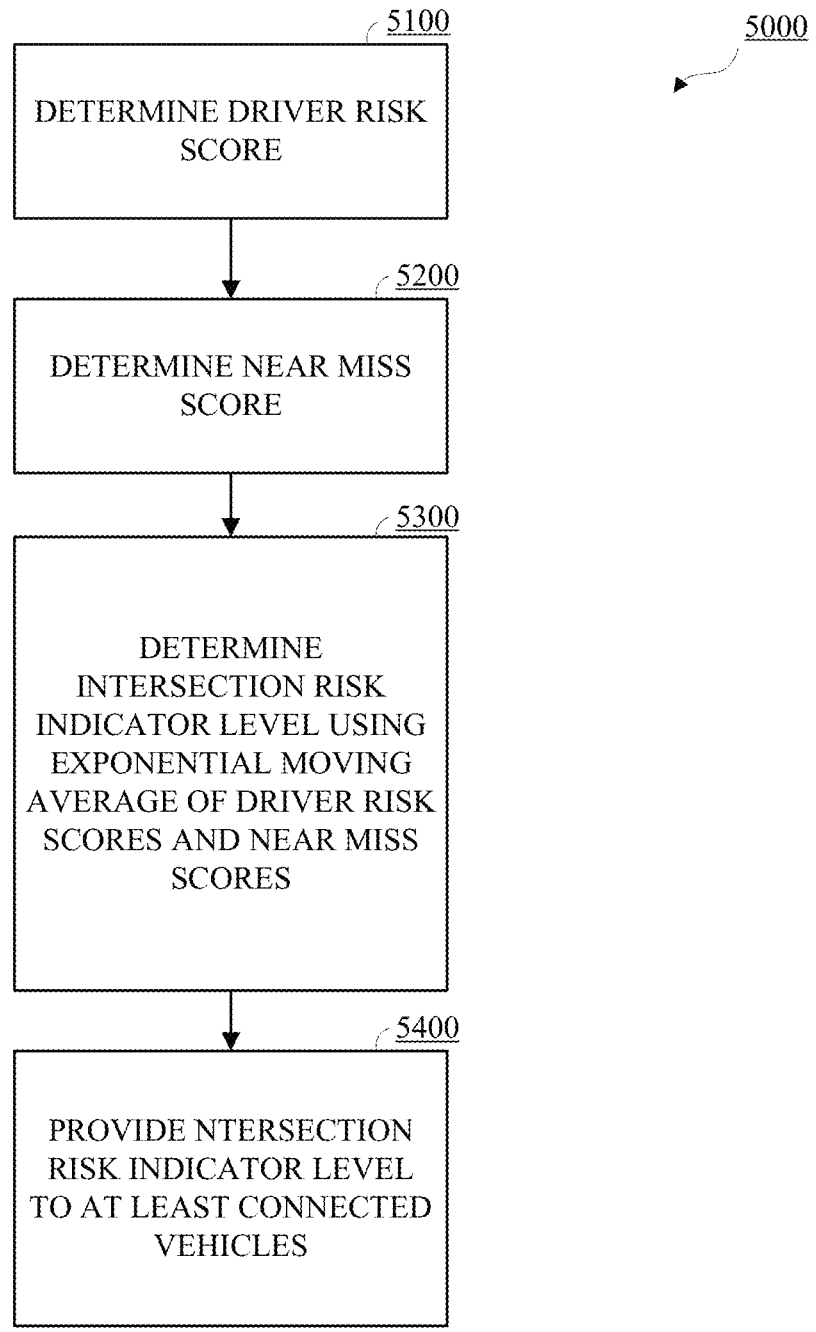
FIG. 5 is a flowchart of an example of a method for determining intersection risk indicators in accordance with embodiments of this disclosure.

FIG. 5 is a flow diagram of an example of a method 5000 for determining intersection risk indicator levels in accordance with embodiments of this disclosure. The method 5000 includes: determining 5100 driver risk scores; determining 5200 near miss scores; determining 5300 intersection risk indicator levels using exponential moving average of driver risk scores and near miss scores; and providing 5400 the intersection risk indicator levels to at least connected vehicles. For example, the method 5000 may be implemented, as applicable and appropriate, by the vehicle 1000, the one or more vehicles 2100/2110, the cloud computing platform or device 2400, the edge computing device 2410, the compute system 3200, the edge compute devices 1 . . . N 3210, the cloud compute platform 3220, the connected vehicles 3114, 3124, and 3134, the compute platform or node 4100 and the connected vehicles 4200 and 4300.

The method 5000 includes determining 5100 driver risk scores. Intersection data can be obtained from connected vehicles and infrastructure sensors and stored at a compute node. A machine learning algorithm such as an unsupervised clustering algorithm can be trained based on using defined driver characteristics related to driver distractedness or attention. Driver risk scores can then be determined or assigned to connected vehicles accordingly.

The method 5000 includes determining 5200 near miss scores. The intersection data can be filtered for near miss candidates based on near miss criteria. A machine learning algorithm can be trained to classify the near miss candidates and assign a near miss score or level accordingly. Near miss scores can then be determined or assigned to intersections based on number of near misses.

The method 5000 includes determining 5300 intersection risk indicator levels using exponential moving average of driver risk scores and near miss scores. The intersection risk indicator levels are assigned based on a weighted average of a current intersection risk indicator score and previous intersection risk indicator scores. The previous intersection risk indicator scores can be a simple moving average of intersection risk indicator scores, where each intersection risk indicator score is a combination of the driver risk score and the near miss score.

The method 5000 includes providing 5400 the intersection risk indicator levels to at least connected vehicles. The intersection risk indicator levels can be provided to connected vehicles and traffic and safety management entities. The connected vehicles can use the intersection risk indicator levels for driver alerts, route planning, planning, map updating, and other vehicle control functions. The traffic and safety management entities can use the intersection risk indicator levels for safety issues related to an intersection, traffic light control, and other related issues.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for determining an intersection risk indicator, the method comprising:
receiving, by a computing node from intersection proximate sensors at each intersection, intersection data;
for each intersection:
determining, by the computing node, for the intersection, a driver risk score based on driver distraction data from the intersection data for each connected vehicle proximate the intersection, wherein determining the driver risk score includes:
associating the each connected vehicle with a risk cluster by clustering, using an unsupervised machine learning algorithm, the driver distraction data from the each connected vehicle to create one or more risk clusters of connected vehicles with similar risk patterns,
assigning a driver distraction score to each risk cluster of the one or more risk clusters,
assigning the driver distraction score to the each connected vehicle based on an associated risk cluster, and
determining the driver risk score for the intersection by fleet voting of the driver distraction scores for the each connected vehicle;
determining, by the computing node, a near miss score for the intersection, the near miss score being based on the intersection data filtered for near miss candidates;
adjusting, by the computing node, the driver risk score by incorporating the near miss score to generate an adjusted driver risk score for the intersection;
determining an intersection risk indicator score for the intersection from the adjusted driver risk score, wherein the intersection risk indicator score is an exponential moving average based on a combination of the adjusted driver risk score and a simple moving average of the adjusted driver risk score;
assigning, by the computing node, an intersection risk indicator level for the intersection based on the intersection risk indicator score; and
providing, by the computing node, intersection risk indicator levels to each connected vehicle such that each connected vehicle is controlled based on the intersection risk indicator levels.

2. The method of claim 1 wherein the intersection proximate sensors includes at least infrastructure sensors proximate each intersection, the determining the near miss score further comprising:
filtering the intersection data based on near miss criteria to detect near miss candidates;
classifying, using a machine learning algorithm, the near miss candidates as a near miss; and
assigning the near miss score based on number of near misses.

3. The method of claim 2, wherein determining the intersection risk indicator scores further comprises:
determining a simple moving average of adjusted driver risk scores for a time period, and
wherein the exponential moving average is a weighted average of an intersection risk indicator score from a current time period and the simple moving average of adjusted driver risk scores of a previous time period.

4. The method of claim 2, wherein the near miss criteria includes braking time relative to obstacle, following distance relative to braking distance, obstacle distance relative to braking distance, vehicle deceleration, lane exceedance probability, or glance duration.

5. The method of claim 1, wherein the intersection risk indicator levels are updated based on a defined period.

6. The method of claim 1, wherein the intersection risk indicator levels are different for different times of day.

7. The method of claim 1, the method further comprising: providing, by the computing node, the intersection risk indicator levels to traffic management entities to facilitate traffic management at the intersections.

8. The method of claim 1, the method further comprising: providing, by the computing node, the intersection risk indicator levels to enable advanced driver-assistance systems on each connected vehicle to alert a driver based on the intersection risk indicator level.

9. The method of claim 1, the method further comprising: providing, by the computing node, the intersection risk indicator levels to each connected vehicle to populate a mapping database.

10. The method of claim 1, wherein the computing node is one or more of a connected vehicle, an edge compute node, or a cloud computing node.

11. A system, comprising:
a compute node;
intersection infrastructure sensors configured to send intersection infrastructure sensor data to the compute node; and
one or more connected vehicles configured to send intersection proximate data to the compute node,
wherein the compute node is configured to:
for each intersection that each of the one or more connected vehicles intersects, determine a driver risk score from driver distraction data in the intersection infrastructure sensor data and the intersection proximate data,
wherein, for the driver risk score, the compute node is further configured to:
use an unsupervised machine learning algorithm to cluster the driver distraction data to create one or more risk clusters of connected vehicles with similar risk patterns,
associate each connected vehicle with a risk cluster,
assign each risk cluster with a driver distraction score,
assign a driver distraction score to each connected vehicle based on an associated risk cluster, and
determine the driver risk score by fleet voting of the driver distraction scores for each connected vehicle;
for each intersection, determine a near miss score based on the intersection infrastructure sensor data and the intersection proximate data for that intersection, the intersection infrastructure sensor data and the intersection proximate data filtered for near miss candidates;
for each intersection, adjust the driver risk score by incorporating the near miss score to generate an adjusted driver risk score for the intersection;

for each intersection, determine an intersection risk indicator score for the intersection from the adjusted driver risk score, wherein the intersection risk indicator score is an exponential moving average based on a combination of the adjusted driver risk score and a simple moving average of adjusted driver risk score;

for each intersection, assign an intersection risk indicator level based on the intersection risk indicator score; and for each of the one or more connected vehicles, provide intersection risk indicator levels such that the one or more connected vehicles is controlled based on the intersection risk indicator levels.

12. The system of claim 11, wherein the unsupervised machine learning algorithm clusters the driver distraction data from each of the connected vehicles based on driving performance measures and driver physical measures and assigns a driver risk score for each risk cluster.

13. The system of claim 11, wherein the compute node is further configured to:

filter the intersection infrastructure sensor data and the intersection proximate data based on near miss criteria to detect near miss candidates; and use a machine learning algorithm to classify the near miss candidates as a near miss and assign the near miss score based on number of near misses.

14. The system of claim 11, wherein the compute node is further configured to:

determine a simple moving average of adjusted driver risk scores for a time period, wherein the exponential moving average is a weighted average of an intersection risk indicator score from a current time period and the simple moving average of adjusted driver risk scores of a previous time period.

15. The system of claim 11, wherein intersection risk indicator levels are updated based on a defined period and wherein the intersection risk indicator levels are different for different times of day.

16. The system of claim 11, wherein the computing node is one or more of an edge compute node or a cloud computing node.

* * * * *